US012624244B2

(12) United States Patent
Dumont et al.

(10) Patent No.: US 12,624,244 B2
(45) Date of Patent: May 12, 2026

(54) PART OF A COSMETIC ARTICLE DECORATED WITH A RESIN, AND METHOD FOR COVERING THIS PART WITH THE RESIN

(71) Applicant: SILGAN DISPENSING SYSTEMS LE TREPORT S.A.S.

(72) Inventors: Pierre Dumont, Le Treport (FR); Frederic Leleu, Le Treport (FR); Pierre-Yves Gilet, Le Treport (FR)

(73) Assignee: SILGAN DISPENSING SYSTEMS LE TREPORT S.A.S., Richmond, VA (US)

( * ) Notice: Subject to any disclaimer, the term of this patent is extended or adjusted under 35 U.S.C. 154(b) by 271 days.

(21) Appl. No.: 18/268,850

(22) PCT Filed: Dec. 9, 2021

(86) PCT No.: PCT/EP2021/085103
§ 371 (c)(1),
(2) Date: Jun. 21, 2023

(87) PCT Pub. No.: WO2022/135963
PCT Pub. Date: Jun. 30, 2022

(65) Prior Publication Data
US 2024/0041180 A1 Feb. 8, 2024

(30) Foreign Application Priority Data

Dec. 23, 2020 (FR) ...................................... 2014041

(51) Int. Cl.
*C09D 175/04* (2006.01)
*A45D 34/00* (2006.01)

(52) U.S. Cl.
CPC ...... *C09D 175/04* (2013.01); *A45D 2034/007* (2013.01)

(58) Field of Classification Search
CPC ............ C09D 175/04; A45D 2034/007; A45D 34/02; C08L 75/04
See application file for complete search history.

(56) References Cited

U.S. PATENT DOCUMENTS

2017/0135458 A1* 5/2017 Thorez .................... B05B 11/10
2021/0186179 A1* 6/2021 Kim ....................... C08J 7/0423

FOREIGN PATENT DOCUMENTS

EP        3679826         7/2020
FR        2889485         2/2007
WO     WO2014054127       4/2014
WO     WO-2019198939 A1 * 10/2019 ............. A45D 33/18

OTHER PUBLICATIONS

Machine Translation of WO 2014/0541127 A1. (Year: 2014).*
International Search Report with English Translation and Written Opinion for PCT Application PCT/EP2021/085103.

* cited by examiner

*Primary Examiner* — Brian Handville
(74) *Attorney, Agent, or Firm* — Hinckley Allen & Snyder; Stephen Holmes

(57) ABSTRACT
The invention provides a part decorated with a polyurethane resin mainly comprising two components. The first component consists of a polyol and the second component consists of isocyanate, the isocyanate-to-polyol weight ratio being comprised between 100:100 and 100:40.

7 Claims, 6 Drawing Sheets

[Fig. 1]
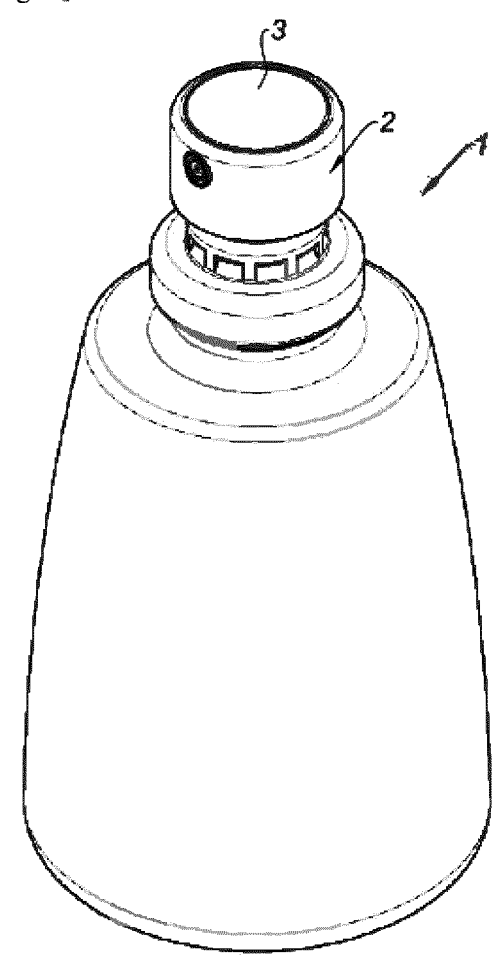
[Fig. 2]
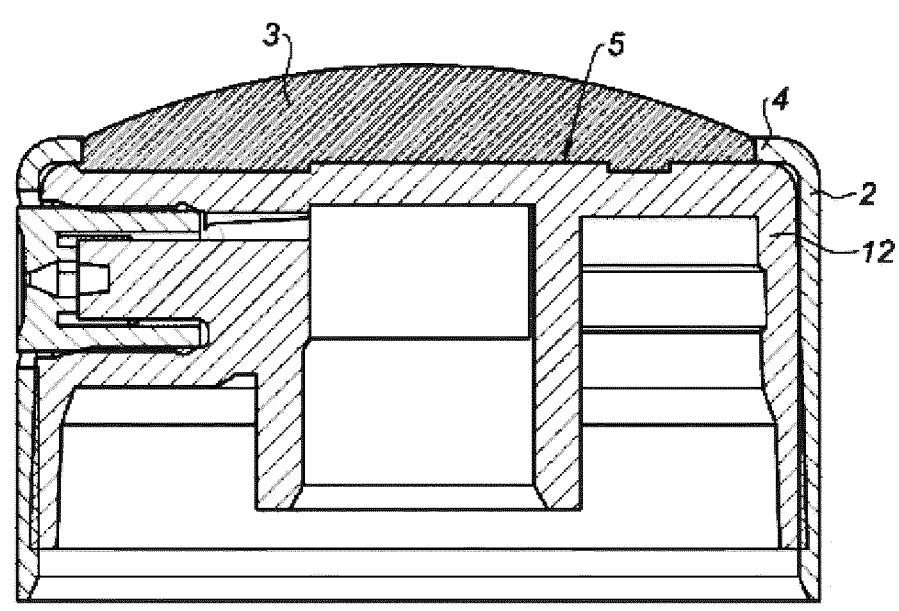

[Fig. 3]
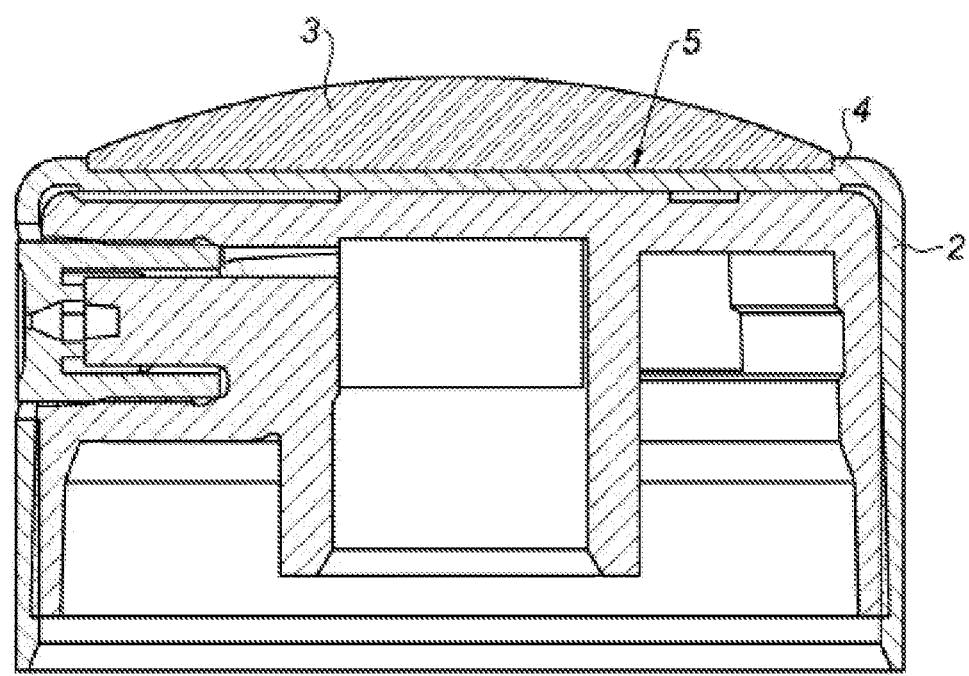
[Fig. 4]
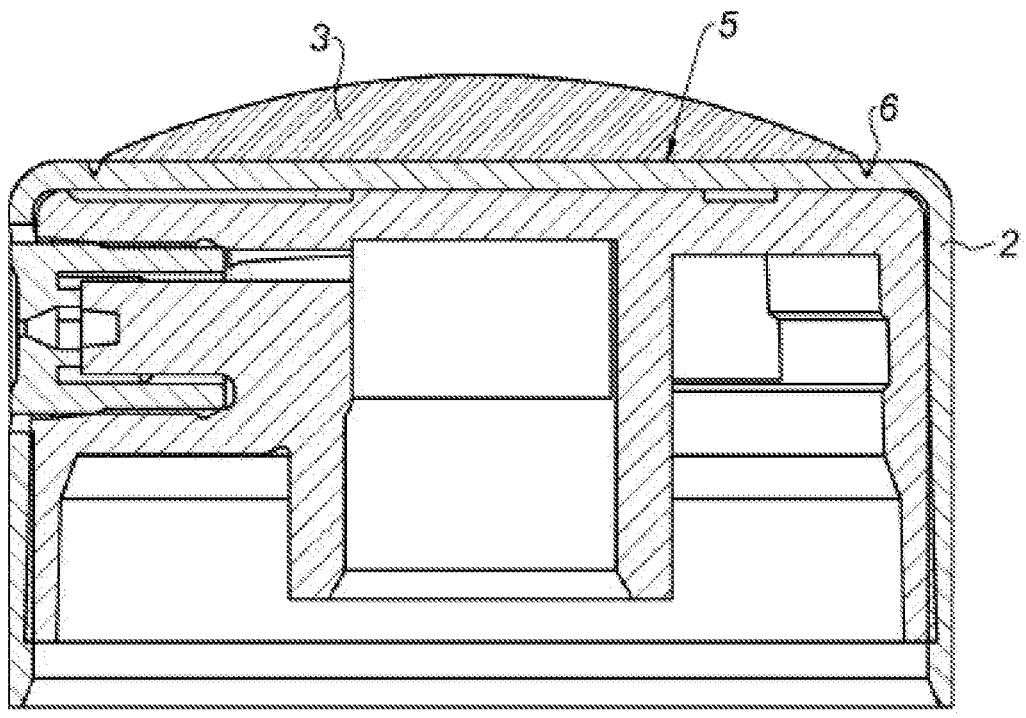

[Fig. 5]

[Fig. 6]
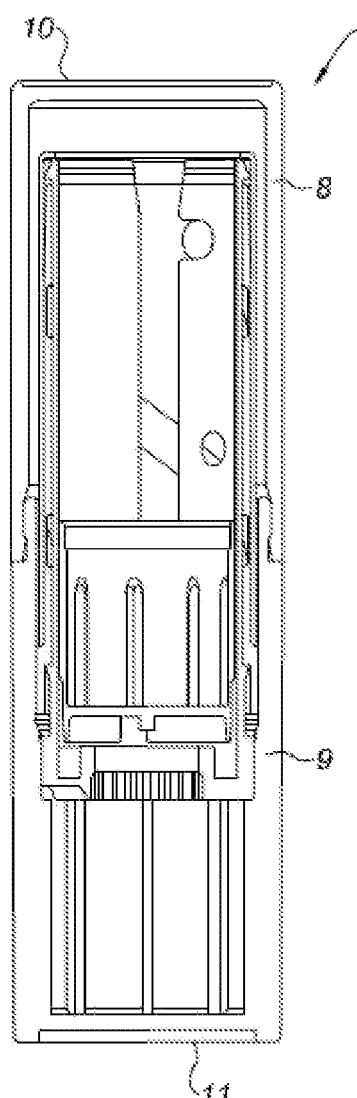
[Fig. 7]
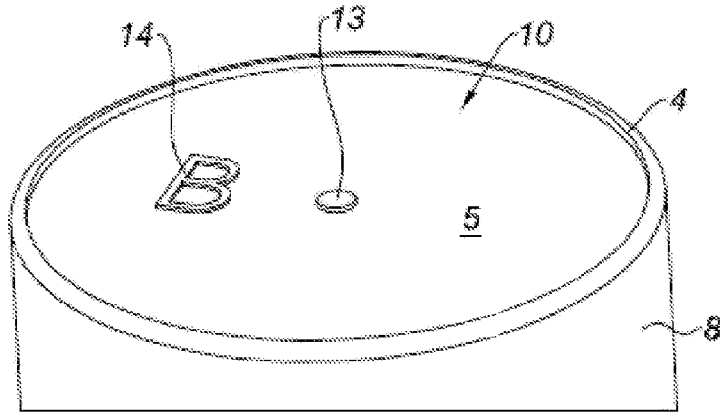

[Fig. 8]
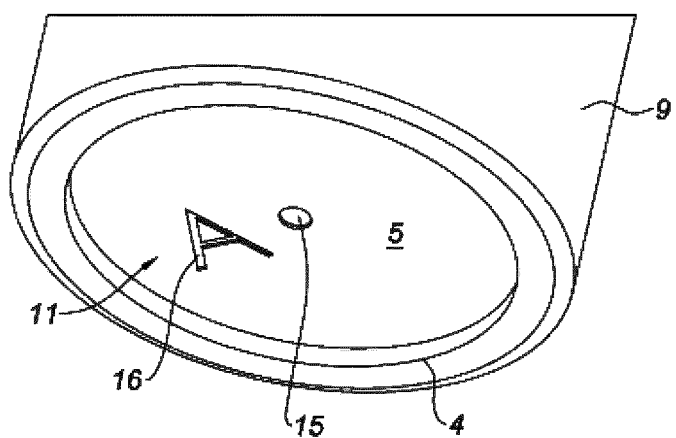
[Fig. 9]
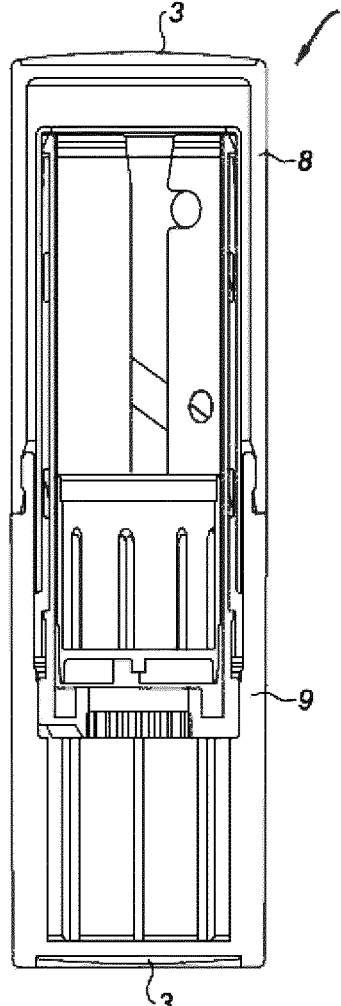

PART OF A COSMETIC ARTICLE DECORATED WITH A RESIN, AND METHOD FOR COVERING THIS PART WITH THE RESIN

CROSS-REFERENCE TO RELATED APPLICATIONS

The present application is a national stage application of International Patent Application Number PCT/EP2021/085103, filed 9 Dec. 2021, which claims priority to French Patent Application Number FR2014041, filed 23 Dec. 2020, the disclosures of which are hereby incorporated by reference in their entireties.

TECHNICAL FIELD OF THE INVENTION

The invention relates to a part decorated with a resin, for example parts for cosmetic items, such as push buttons for product dispensers or tubes for lipstick. This resin has an aesthetic appearance akin to that of enamel.

The invention relates to a method of manufacturing this resin and coating this part with the decorative resin.

TECHNICAL BACKGROUND

Fashion jewelry, key rings, interior decorations, etc., have all been designed with enamel, providing a distinctive aesthetic effect.

Enamel is produced at high temperatures, in the range of several hundred degrees.

Plastic parts therefore cannot be used in this enamel production method, as plastic parts would warp and be unable to withstand such high heat.

This is particularly true of plastic parts for cosmetics items. These can be push buttons on a device for dispensing fluid products. They can also be caps for lipstick tubes. There are many plastic and/or metal parts to which it would be aesthetically desirable to give an enamel-like appearance.

With regard to push buttons, it is preferable to have an upper pressure-bearing surface made of resin, with a slightly domed shape.

The purpose of this invention is to provide a resin that can be used to decorate plastic parts and which has an enamel-like appearance. This resin must be chosen so as to obtain:

- a resin dome overtopping the push button at an adequate height;
- a suitable hardness (measured in Shore D), i.e., resistant to scratches, for example from a user's fingernail;
- a viscosity that is ideal for coating a deposition area provided on the plastic part, therefore sufficiently fluid but also sufficiently viscous so as not to overflow the area;
- consistency in the color to be obtained;
- good abrasion resistance;
- a glossy surface with no bubbles.

The part to be decorated must have a suitable area for containing the resin. The parameters for depositing the resin on the part must also be correctly defined in order to obtain a convincing final result akin to that of enamel in terms of decorative effect. Indeed, the goal is to obtain a smooth, glossy, domed, surface with no bubbles.

SUMMARY OF THE INVENTION

This goal is achieved by means of a part for a cosmetic item, which has an area coated with a decorative polyurethane resin mainly comprising two components.

This part is characterized primarily in that the first component of the resin consists of a polyol and the second component of the resin consists of isocyanate, the isocyanate-to-polyol weight ratio being comprised between 100:100 and 100:40.

The main idea of this invention consists of designing a part decorated with a polyurethane resin obtained from a mixture of two components: polyol and isocyanate. The base element is polyol, which has viscosity characteristics that enable it to be applied and spread on flat surfaces, provides a good aesthetic finish in terms of gloss, and is used to apply clear coats, for example. The "base element" is the element offering the right aesthetic result, to which a "hardener" must be added, regardless of the respective amounts of the two products. Isocyanate is a hardener, which is required in the formulation to achieve a three-dimensional (3D) shape such as a dome. It also makes it possible to obtain a final resin with a certain hardness and therefore scratch-resistant.

The ratio between the amount of polyol and the amount of isocyanate makes it possible to obtain a final formulation that meets all of the above criteria, namely hardness, viscosity, surface finish, color consistency, abrasion resistance and 3D formability.

According to the various embodiments of the invention, which can be taken together or separately:

- the isocyanate-to-polyol weight ratio is comprised between 100:57 and 100:67.
- the isocyanate-to-polyol weight ratio is preferably 100:62.
- the viscosity of the resin is between 400 and 600 mPa·s at an ambient temperature of around 25° C., when the resin is applied to a part to be decorated.
- the resin also comprises one or more colorant(s).

This part can be, for example, a push button or a cap for a lipstick tube. Said area has a surface to be decorated delineated by a change in shape such as a rim, groove or bend.

According to a first possible configuration, the resin coating said area has an outer surface with a rounded, dome-shaped appearance.

For example, if the surface to be decorated is delineated by a rim, the apex of the dome will overtop the rim.

According to a second possible configuration, the resin coating said area has an outer surface with a flat appearance. It can be located flush with the rim, or under the rim, for example. Any other type of resin arrangement and height can be foreseen.

After the part is heated, the hardness of the resin is at least 80 Shore D. Preferably, the hardness of the resin, and therefore of the dome if there is one, is greater than 85 Shore D. The part can be heated by stoving.

The invention also relates to a method of manufacturing a resin and of coating a part with this resin as described above, comprising the following steps:

- degassing each component of the resin in a vacuum chamber;
- mixing the polyol with the isocyanate;
- coating the area of the part with the resin;
- curing the part.

The amount of resin poured is calibrated.

More specifically, this method is preferably carried out at the following preferential temperatures and for the following times:

- degassing each component of the resin for at least 10 minutes in a vacuum chamber;
- mixing the polyol with the isocyanate at a temperature comprised between 20° C. and 40° C.;

coating the area of the part with a calibrated amount of resin;

curing the part for 30 to 90 minutes at between 60° C. and 100° C.

Preferably, the polyol is mixed with the isocyanate at a temperature between 33° C. and 37° C., preferably at 35° C.

Preferably, the area of the part is coated with an amount of resin calibrated between 0.05 g and 0.2 g. This is particularly true, for example, for a surface to be decorated with a surface area of 70 mm² to 300 mm². This calibration affects the shape of the dome in particular. Ideally, 0.1 g of resin deposited in the area will form a 0.9 mm overtopping dome. The greater the amount of resin, the more pronounced the dome.

Preferably, the resin-decorated part is heated for 45 minutes at 80° C. Heating the part on which the resin is deposited hardens the dome, and the resin will thus have reached its final hardness.

As an alternative, the previously-defined goal is also achieved by means of a part for a cosmetic item, comprising an area coated with a decorative epoxy polymer resin mainly comprising two components. This part is characterized primarily in that the first component of the resin consists of an epoxy monomer and the second component of the resin consists of a polyamine, the epoxy monomer-to-polyamine weight ratio being comprised between 100:50 and 100:40. The epoxy monomer-to-polyamine volume ratio is between 100:40 and 100:60.

As with the previous resin, the main idea of this invention is to design a part for a cosmetic article, which has an area coated with a decorative epoxy polymer resin mainly comprising two components: epoxy monomers and a polyamine. Epoxy monomer makes it possible to achieve good aesthetic results in terms of gloss and is used to apply clear coats, for example. Polyamine is a hardener used to polymerize epoxy monomers and is needed in the formulation to obtain a three-dimensional (3D) shape such as a dome. It also makes it possible to obtain a final resin with a certain hardness and therefore scratch-resistant.

The ratio between the amount of epoxy monomer and the amount of polyamine makes it possible to obtain a final formulation that meets all of the above criteria, namely hardness, viscosity, surface finish, color consistency, abrasion resistance and 3D formability.

According to the various embodiments of the invention, which can be taken together or separately:

the epoxy monomer-to-polyamine weight ratio is preferably 100:45.

the epoxy monomer-to-polyamine volume ratio is preferably 100:50 the resin also comprises one or more colorant(s), the colorant(s) are first mixed with the epoxy monomer.

Said part decorated with this second resin and the area to be coated can be of the same configuration as the ones mentioned above relative to the polyurethane resin. Likewise, the method described above relative to the polyurethane resin follows the same steps as for the epoxy resin.

More specifically, this method is preferably carried out at the following preferential temperatures and for the following times:

degassing each component of the resin for at least 10 minutes in a vacuum chamber;

mixing the epoxy monomer with the polyamine at a temperature comprised between 20° C. and 40° C.;

coating the area of the part with a calibrated amount of resin;

curing the part for 18 to 30 hours, preferentially 24 hours at between 40° C. and 70° C., preferentially between 50° and 60°, more preferentially at 60°.

Preferably, the epoxy monomer is mixed with the polyamine at a temperature between 33° C. and 37° C., preferably at 35° C. Heating the part on which the resin is deposited hardens the dome, and the resin will thus have reached its final hardness.

The area of the part is coated in the same conditions and with the same amount of resin as explained above relative to the polyurethane resin.

BRIEF DESCRIPTION OF THE FIGURES

Further features and advantages of the invention will become apparent from the following detailed description, for the understanding of which reference is made to the appended drawings in which:

FIG. 1 is a perspective view of a fluid product dispensing system with a resin-coated dispensing head;

FIG. 2 is a cross-sectional view of the dispensing head in FIG. 1, showing a resin-decorated push button according to a first configuration;

FIG. 3 is a cross-sectional view of a dispensing head showing a resin-decorated push button according to a second configuration;

FIG. 4 is a cross-sectional view of a dispensing head showing a resin-decorated push button according to a third configuration;

FIG. 5 is a cross-sectional view of a dispensing head showing a resin-decorated push button according to a fourth configuration;

FIG. 6 is a cross-sectional view of a lipstick tube ready to be decorated;

FIG. 7 is a detailed view of the upper part of the tube in FIG. 6;

FIG. 8 is a detailed view of the lower part of the tube in FIG. 6;

FIG. 9 is a cross-sectional view of the lipstick tube decorated with the resin according to the invention;

FIG. 10 is a detailed view of the upper part of the tube in FIG. 9;

FIG. 11 is a detailed view of the lower part of the tube in FIG. 9.

DETAILED DESCRIPTION OF THE INVENTION

In the remainder of the description, elements with identical structures or similar functions will be referred to by the same references.

FIG. 1 illustrates a system 1 for dispensing a fluid product, such as a cosmetic product or a pharmaceutical product. This dispensing system 1 has a push button on the upper part which the user presses to activate a pump or a valve that delivers a dose of product through an outlet port. To improve the aesthetics of this push button, it is desirable that the pressure-bearing surface on the top of the push button be "enameled." The invention thus consists of coating the pressure-bearing surface with a resin that has an enamel-like appearance from an aesthetic point of view.

To achieve the desired enamel-like finish on the final part, the resin used is a polyurethane resin obtained from a mixture of two components: polyol and isocyanate. As it is known, a polyol and isocyanate chemically react together to form polyurethane. Polyol makes it possible to achieve good aesthetic results (gloss) and is used to apply clear coats, for example on labels. Isocyanate is a hardener, which is required in the formulation to achieve a 3D shape such as a dome.

An example of a polyol is PX 5213 POLYOL and an example of isocyanate is PX 5210 ISOCYANATE, both offered by SIKA.

Weight ratio (w/w): 100 g of isocyanate (hardener) is ideally mixed with 62 g of polyol. Nevertheless, an amount of polyol in the range of 40-100 g is acceptable, more preferentially 57-67 g. The hardener (isocyanate) is used to obtain the required hardness of the resin. The shore D of the resin should be at least 80, and is recommended to be above 85.

The viscosity of the polyol/isocyanate mixture at 25° C., which is the ambient temperature in the resin application workshop, is comprised between 400 and 600 mPa·s: below 600 mPa·s for rapid resin flow onto the button, compatible with short cycle times, and above 400 mPa·s so that the resin does not overflow the upper surface of the button during the manufacturing cycle.

Another type of resin used to achieve an enamel-like finish is an epoxy polymer resin obtained from a two-component mixture of epoxy monomers and polyamine. The polyamine reacts with the epoxy monomers to achieve polymerization. Epoxy monomers make it possible to achieve good aesthetic results (gloss). Polyamine is a hardener, or cross-linking agent, required in the formulation to obtain a 3D shape such as a dome.

An example of an epoxy monomer is 2,2-Bis[p-(2,3-epoxypropoxy)phenyl]propane, available under the reference SikaBiresin TD150 (A) offered by SIKA. An example of a polyamine is Polyoxypropylenediamine, available under the reference SikaBiresin TD150 (B), also offered by SIKA.

Weight ratio (w/w): 100 g of epoxy monomer is ideally mixed with 45 g of polyamine (hardener). Nevertheless, an amount of polyamine in the range of 40-50 g is acceptable. The polyamine hardener is used to obtain the required hardness of the resin. The shore D of the resin should be at least 80, and is recommended to be above 85.

Whatever the resin, in this case the resin deposition area is located on the upper part of the push button, in a space that can have different geometric shapes.

The push button consists mainly of an outer decorative cap 2 and of an inner body 12 inserted inside the decorative cap 2.

In FIG. 2, the decorative cap 2 comprises a peripheral wall that is extended by an annular rim 4 on the upper part, which delineates a center hole revealing the body 12 of the push button. In this case, the surface to be decorated 5 corresponds to the upper surface of the body 12 of the push button, which is visible through the center hole when seen from the top. The area to be coated with resin is thus delineated by the upper surface of the body 12 of the push button and by the annular rim 4 of the decorative cap 2. The resin 3 is cast into this area, in a sufficient amount to form a dome, if possible, for added aesthetic effect. The apex of the dome overtops the rim 4 in this case. However, it would be altogether possible to lay the resin 3 flat, without a dome.

The center hole of the decorative cap 2 has a round shape in this case, but could also have any other shape, using a suitable punch.

In FIG. 3, the decorative cap 2 comprises a peripheral wall that is extended by an upper wall. Instead of the center hole in FIG. 3, there is a recessed upper surface. The same annular rim 4 is also present, but this time it delineates the recess in the upper surface.

In this case, the surface to be decorated 5 corresponds to the surface of the recess of the decorative cap 2. The area to be coated with resin is thus delineated by this surface to be decorated 5 and by the annular rim 4. In this FIG. 3, the resin 3 is cast in the shape of a dome, with the apex of the dome overtopping the annular rim 4. As previously stated, it would be altogether possible to lay the resin 3 flat, without a dome. Likewise, the recess of the decorative cap 2 has a round shape in this case, but could also have any other shape.

In FIG. 4, the decorative cap 2 comprises a peripheral wall that is extended by an upper wall. This upper surface has a flat appearance, with no recess or rim. A groove 6, in this case annular, is cut all around this surface to delineate the surface to be decorated 5. Any resin overflow is contained by the effect of the surface tension of the liquid resin. This surface to be decorated 5 surrounded by the groove 6 therefore corresponds to the area to be coated with resin. Again, the resin 3 is cast in the shape of a dome. Likewise, the groove 6 of the decorative cap 2 can have a round shape, or any other shape.

Figure 5:
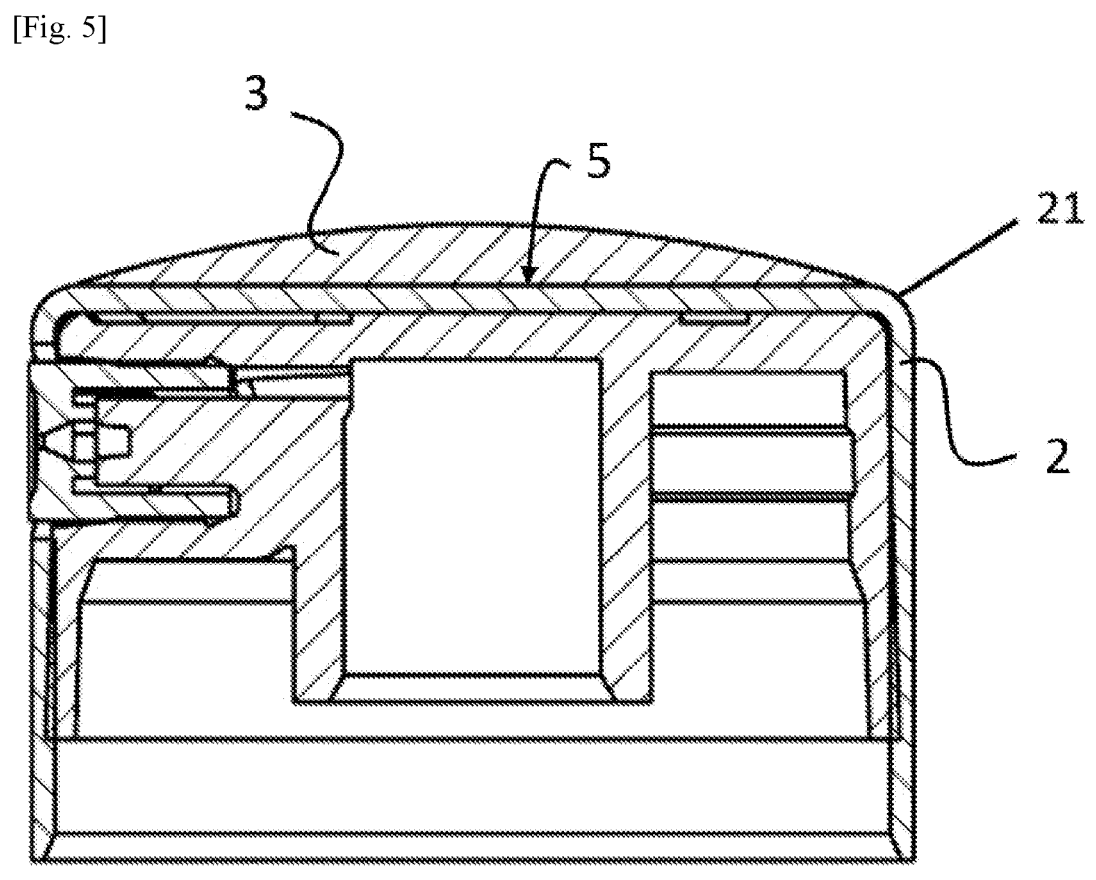

In FIG. 5, the decorative cap 2 comprises a peripheral bend 21. This upper surface has a flat appearance, with no recess or rim. The peripheral bend 21 will delineate the surface to be decorated 5. Any resin overflow is contained by the effect of the surface tension of the liquid resin around the bend 21. This surface to be decorated 5 limited by this bend 21 therefore corresponds to the area to be coated with resin. Again, the resin 3 is cast in the shape of a dome. The bend radius of the bend 21 is comprised between 0.4 and 0.9 mm, preferentially around 0.7 mm.

The deposition of resin 3 can be used for another type of cosmetic packaging, in this case lipstick tubes 7, as illustrated in FIG. 6. A lipstick tube 7 generally comprises a body 9 topped by a removable cap 8. Both the cap 8 and the body 9 generally leave an injection point on the outside of their respective molds, since it is simpler in the injection method to have the injection plane on the outside of the parts rather than on the inside.

FIG. 7 shows the upper part 10 of the tube 7, in this case the upper surface of the cap 8, which corresponds to the surface to be decorated 5, and which clearly has a protruding injection point 13, and optionally also a raised reference stamp 14.

FIG. 8 shows the lower part 11 of the tube 7, in this case the lower surface of the body 9, which corresponds to the surface to be decorated 5, and which clearly has an injection point 15, this time recessed, with optionally also a recessed reference stamp 16.

The upper surface of the cap 8 is delineated by an annular rim 4, forming the area to be coated with resin.

The lower surface of the body 9 is delineated by an annular rim 4, forming the area to be coated with resin.

Figures 10, 11:
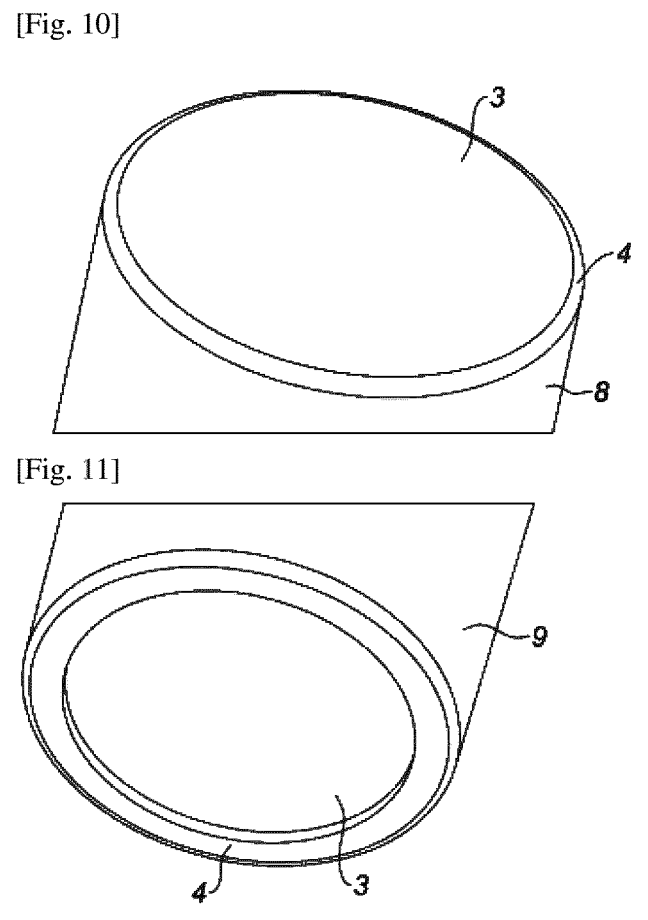

On the bottom of body 9, the resin deposit 3 must not form a prominent dome, otherwise the lipstick tube 7 is no longer stable when placed on a supporting surface. It is therefore necessary for the resin 3 to be flat and not exceed the height of the annular rim 4, or for the resin 3 to still form a dome but whose apex does not overtop the annular rim 4 such that the lipstick tube 7 can always rest at least on the annular rim 4, as illustrated in FIGS. 9 and 11. For the cap 8, a dome shape, similar to those of the push button previously described, can be foreseen, as illustrated in FIGS. 9 and 10.

Other types of parts to be decorated can also be chosen, without necessarily pertaining to the cosmetics or pharmaceutical fields.

Regarding the procedure for manufacturing the resin and then casting it onto the part to be decorated, various parameters must be adhered to for an optimal enamel-like finish, whether polyurethane resin or epoxy polymer resin is used.

First of all, complete degassing of each component is crucial to obtain a compound that is free of entrapped air. This is done beforehand for at least 10 minutes in a vacuum chamber, for each component.

A colorant can be added to the polyol (to make the polyurethane resin) or to the epoxy monomers (to make the epoxy polymer resin) before degassing and before mixing with the hardener. When a deep, i.e., non-transparent, color is desired, a white colorant is added to the chosen color to provide opacity. Conversely, if a transparent effect is desired, only the desired color is added, with no white colorant. The colorant(s) can optionally be added to the hardener.

Next, the two-component resin is obtained by mixing the precise amounts of the two aforementioned components, polyol and isocyanate for the polyurethane resin, and epoxy monomers and polyamine for the epoxy polymer resin. This is achieved by using a micrometric dosing device for each component and then mixing them together before depositing them on the part, using a mechanical mixer consisting of a propeller inside a frame, one rotating relative to the other, forcing the two components to intersect as they flow through the mixer. Mixing is carried out at a temperature between 20° C. and 40° C., preferentially between 33° C. and 37° C., ideally at 35° C. This higher-than-ambient temperature ensures homogeneous mixing. If the mixing temperature is too cold, the two products are too viscous and mix poorly, resulting in inhomogeneous mixing. The hardener is not evenly distributed and, in the subsequent curing step, the surface will be uneven, with surface irregularities, bubbles or partially cured areas. If the temperature is too high, although the products to be mixed will initially be fluid enough for the hardener to be evenly distributed, the polymerization process will be too far along at the end of mixing, and the resulting resin will no longer be fluid enough when deposited on the part to flow spontaneously into the desired dome shape. The resin will be too solidified. The resulting mixture is deposited on the part to be decorated. Optionally, if the deposition area is made of plastic, this area of the part will have been plasma-treated beforehand to enhance the bond between the surface of the deposition area and the resin.

The deposition area can be metal, for example, or any other material.

The amount of resin to be deposited must be calibrated and must be between 0.05 g and 0.2 g for a surface area between 70 mm$^2$ and 300 mm$^2$. This will affect the shape of the dome. Ideally, 0.1 g of resin is deposited to form a 0.9 mm overtopping dome. The greater the amount, the more pronounced the dome.

Once the resin has been deposited in the allocated space, the decorated parts must be held a stove according to a different protocol for each type of resin. For polyurethane resin, the holding time is at least 45 minutes at 80° C. The time range can be reduced if the stove is warmer, and conversely. For example, 90 minutes at 60° C. or 30 minutes at 100° C. For the epoxy polymer resin, the holding time is at least 18 hours, ideally 24 hours, at a temperature between 40° C. and 70° C., and more preferentially between 50° C. and 60° C., more preferentially at 60° C. The dome is then hardened and has the desired hardness and scratch resistance.

The configurations shown in the referenced figures are only possible, but by no means limiting, examples of the invention, which on the contrary encompasses all of the various shapes and designs available to the person skilled in the art.

The invention claimed is:

1. A push button for a cosmetic item comprising a surface area delineated by a bend, the surface area and bend being suitable for containing a flowable decorative polyurethane resin, said surface area being coated with a decorative polyurethane resin comprising:

a polyol; and an isocyanate;

wherein the isocyanate-to-polyol weight ratio is between 100:57 and 100:67 wherein the viscosity of the decorative polyurethane resin is between 400 and 600 mPa's at an ambient temperature of around 25° C., when the resin is applied to a part to be decorated, wherein the resulting hardness of the decorative polyurethane resin is at least 80 Shore D, wherein the decorative polyurethane resin when hardened comprises an outer surface with a rounded, dome-shaped appearance having an apex, and wherein the decorative polyurethane resin has a smooth, glossy domed surface with an aesthetic appearance akin to that of enamel when hardened.

2. The push button of claim 1, wherein the isocyanate-to-polyol weight ratio is 100:62.

3. The push button of claim 1, wherein the decorative polyurethane resin further comprises at least one colorant.

4. The push button of claim 1, wherein said area comprises a surface delineated by a rim.

5. The push button of claim 4, wherein the decorative polyurethane resin coating said area comprises an outer surface with a dome having an apex overtopping said rim.

6. The push-button of claim 1, wherein the surface area of the part is inclusively between 70 mm$^2$ to 300 mm$^2$ and is coated with an amount of resin calibrated inclusively between 0.05 g and 0.2 g.

7. The push-button of claim 1, wherein 0.1 g of resin is deposited in the area forming a 0.9 mm overtopping dome.

* * * * *